United States Patent
Fomitchov et al.

(10) Patent No.: US 9,373,158 B2
(45) Date of Patent: Jun. 21, 2016

(54) METHOD FOR REDUCING IMAGE ARTIFACTS PRODUCED BY A CMOS CAMERA

(75) Inventors: Pavel A. Fomitchov, New York, NY (US); Witold Bula, St Catharines (CA); Carlos Zarate, Caba (AR); Yang Zhang, Bordentown, NJ (US)

(73) Assignee: GE Healthcare Bio-Sciences Corp., Piscataway, NJ (US)

( * ) Notice: Subject to any disclaimer, the term of this patent is extended or adjusted under 35 U.S.C. 154(b) by 270 days.

(21) Appl. No.: 13/813,197

(22) PCT Filed: Jul. 19, 2011
(Under 37 CFR 1.47)

(86) PCT No.: PCT/US2011/044477
§ 371 (c)(1),
(2), (4) Date: Jan. 30, 2013

(87) PCT Pub. No.: WO2012/015628
PCT Pub. Date: Feb. 2, 2012

(65) Prior Publication Data
US 2013/0129212 A1    May 23, 2013

Related U.S. Application Data

(60) Provisional application No. 61/369,093, filed on Jul. 30, 2010.

(51) Int. Cl.
*G06K 9/00*    (2006.01)
*G06T 5/00*    (2006.01)
*H04N 1/409*   (2006.01)
*H04N 5/357*   (2011.01)

(52) U.S. Cl.
CPC ....... *G06T 5/00* (2013.01); *H04N 1/409* (2013.01); *H04N 5/357* (2013.01)

(58) Field of Classification Search
USPC ............. 382/128, 166, 167, 254, 261, 275;
348/222.1, 231.6, 231.99, 234, 241,
348/243, 245, 246, 247, 250, 254, 255, 272,
348/273, 294, 534; 358/483
See application file for complete search history.

(56) References Cited

U.S. PATENT DOCUMENTS

| | | |
|---|---|---|
| 5,065,444 A | 11/1991 | Garber |
| 5,818,525 A | 10/1998 | Elabd |
| 6,330,081 B1 | 12/2001 | Scholten |
| 6,646,681 B1 * | 11/2003 | Macy et al. .......... 348/241 |
| 2008/0240559 A1 | 10/2008 | Malvar |
| 2008/0266413 A1 | 10/2008 | Cohen et al. |
| 2009/0024331 A1 * | 1/2009 | Tomaney et al. .......... 702/19 |
| 2010/0128221 A1 | 5/2010 | Muller et al. |

* cited by examiner

*Primary Examiner* — Yon Couso
(74) *Attorney, Agent, or Firm* — Sutherland Asbill & Brennan LLP

(57) ABSTRACT

The present invention relates to a system and method for reducing image artifacts for a CMOS camera used as an optical detector for a line confocal fluorescent imager. The method for reducing image artifacts in a monochromatic image comprises subtracting RGB channel offset mismatch; and correcting random row offset for each row. Preferably, the method also comprises correcting random column offset and gain. Optionally, the method also comprises clipping of defective pixels, and/or subtracting dark current. When the monochromatic image is a fluorescence image, the method also comprises a step of compressing CMOS camera noise. Also provided are a system for reducing image artifacts in a monochromatic image from a CMOS camera, as well as an image artifact reduction system for a CMOS camera-based line confocal fluorescent microscope.

14 Claims, 3 Drawing Sheets

METHOD FOR REDUCING IMAGE ARTIFACTS PRODUCED BY A CMOS CAMERA

CROSS-REFERENCE TO RELATED APPLICATIONS

This application is a filing under 35 U.S.C. 371 of international application number PCT/US2011/044477, filed Jul. 19, 2011, published on Feb. 2, 2012 as WO 2012/015628, which claims priority to U.S. provisional patent application No. 61/369,093 filed Jul. 30, 2010; the disclosure of which is incorporated herein by reference in its entirety.

FIELD OF THE INVENTION

The present invention relates to a system and method for reducing image artifacts. Specifically, the invention relates to a system and method for reducing image artifacts when a CMOS camera is used as an optical detector for a line confocal fluorescent imager.

BACKGROUND OF THE INVENTION

CMOS imagers (complementary metal-oxide-semiconductor imagers) are well known. Images generated from CMOS or other imagers typically comprise thousands or even millions of picture elements called "pixels" arranged in rows and columns (array). Pixel cells contain photosensors. Each pixel cell produces a signal corresponding to the intensity of light impinging on its photosensor when an image is focused on the array by one or more lenses. These signals may be stored in a memory and displayed on a monitor, manipulated by software, printed to paper, or otherwise used to provide information about the image. The magnitude of the signal produced by each pixel is substantially proportional to the amount of light impinging on a respective photosensor.

One or more values, each usually comprising 8 or more bits, are typically associated with each pixel. In a grayscale image, just one value corresponding to brightness is associated with each pixel. In color images, three or four values are associated with each pixel, depending on the color space used by the imager or processing software. In the RGB color space, a red value (R), a blue value (B), and a green value (G) are associated with each pixel.

A raw image acquired with the use of a CMOS camera such as Lumenera LW175M contains certain artifacts. Current CMOS chips offer an automated image correction procedure that performs some image corrections. Recently, CMOS is being used as an optical detector for line confocal fluorescent imager, in the biomedical research field. However, the embedded image correction software does not provide sufficient quality images.

Correcting the root causes of false color artifacts requires additional hardware components or substitution of higher-quality hardware components, for example a pixel array with more pixels or lenses that refract varying wavelengths of light more evenly. These solutions are often impractical, particularly for low-cost imagers.

A less expensive method for reducing false color artifacts is desirable and provided by the current application.

SUMMARY OF THE INVENTION

The present invention provides image processing algorithms and systems for reducing several image artifacts produced by a CMOS camera in a monochromatic image. The present invention further provides algorithms and systems for reducing such image artifacts in a line confocal fluorescent imager which uses a CMOS camera as the optical detector. The methods and systems offer superior image artifact reduction in comparison with the built-in functions by the manufacturer of CMOS camera. More specifically, the system and method subtract dark current and reduce CMOS artifacts for all images. Artifacts reductions include RGB channel offset mismatch and random row offset. Optionally, artifacts reductions also include random column offset and gain, as well as correction of defective pixels.

Thus, in one aspect of the invention, it is provides a method for reducing image artifacts in a monochromatic image from a CMOS camera, which method comprises: subtracting RGB channel offset mismatch; and correcting random row offset for each row. Preferably, the method further comprises: correcting random column offset and gain. Optionally, the method also comprises clipping of defective pixels. Also optionally, the method comprises subtracting dark current.

Furthermore, when the monochromatic image is a fluorescence image, the method comprises an optional step of compressing CMOS camera noise. In one embodiment, the step of compressing CMOS camera noise is implemented by altering original pixel intensity value by an amount that depends from a difference between actual pixel intensity and dark image mean intensity.

Preferably, the step of subtracting RGB channel offset mismatch includes: (a) within each color group of pixels from pre-black rows, calculate the mean level and standard deviation over all pixels with non-zero level; (b) calculate the mean and standard deviation again, over all pixels whose level differs from the mean of step (a) by less than 3 times the standard deviation, to obtain the mean and standard deviation for each color group; and (c) for each pixel in the given color group, subtract the group mean obtained from step (b) and add a constant offset of 100; if the result is negative, clip it to 0; and (d) repeat steps (a) through (c) for each of the other color group of pixels until measurement is completed for all three color groups.

Also preferably, the step of correcting random row offset for each row includes: (a) calculating mean level for groups of pixels including pre-black even columns, pre-black odd columns, post-black even columns and post-black odd columns; and (b) applying a weighed offset for each of the mean levels.

Also preferably, the step of correcting random column offset and gain step includes: (a) generating correction images including acquiring a dark noise image and a uniform bright image, then subtracting the dark noise image from the bright image; (b) calculating, for each column of the correction image, average and standard deviation within each color group; and calculate the average and standard deviation again, for those pixels which are within 3 sigma distance from the average to acquire four vectors containing column variance for each of the four colors; and (c) removing shading from each of the four column variance vectors; (d) optionally subtracting bias image pixels from the image under correction; (e) correcting the image using the four vectors containing column variance for each of the four colors; and (f) re-establishing the correction image if necessary.

In one specific embodiment, the invention provides a method for reducing image artifacts originating from RGB channel offset mismatch, in a monochromatic image from a CMOS camera. The method comprises (a) within each color group of pixels from pre-black rows, calculate the mean and standard deviation over all pixels with non-zero level; (b) calculate the mean and standard deviation again, over all pixels whose level differs from the mean of step (a) by less than 3 times the standard deviation, to obtain the mean and standard deviation for each color group; (c) for each pixel in the given color group, subtract the group mean obtained from step (b) and add a constant offset of 100; if the result is negative, clip it to 0; and (d) repeat steps (a) through (c) for each of the other color group of pixels until measurement is completed for all three color groups.

In another aspect of the invention, it provides a system 300 for reducing image artifacts in a monochromatic image from a CMOS camera 302. The system 300 comprises (a) an input device 304 configured to provide image data from the CMOS camera 302; and (b) a processor 306 coupled to the input device 304 and the processor is configured to: (1) subtracting RGB channel offset mismatch; and (2) correcting random row offset for each row. Preferably, the processor is also configured to correcting random column offset and gain. Optionally, the processor is also configured to clipping defective pixels. Also optionally, the processor is also configured to subtracting dark current. In certain embodiments, when the monochromatic image is a fluorescence image, the processor is also configured to compressing CMOS camera 302 noise.

In another aspect of the invention, it is provides an image artifact reduction system for a monochromatic image for a CMOS camera-based line confocal fluorescent microscope. The system comprises: (a) one or more CMOS cameras capable of generating monochromatic images; (b) a system for reducing image artifacts for the monochromatic image, comprising an input device configured to provide image data from the CMOS camera; and a processor coupled to the input device and configured to subtracting RGB channel offset mismatch; and correcting random row offset for each row. Preferably, the processor is also configured to correcting random column offset and gain. Optionally, the processor is also configured to clipping defective pixels. Also optionally, the processor is also configured to subtracting dark current. In certain embodiments, when the monochromatic image is a fluorescence image, the processor is also configured to compressing CMOS camera noise.

DETAILED DESCRIPTION OF THE INVENTION

Figure 1:
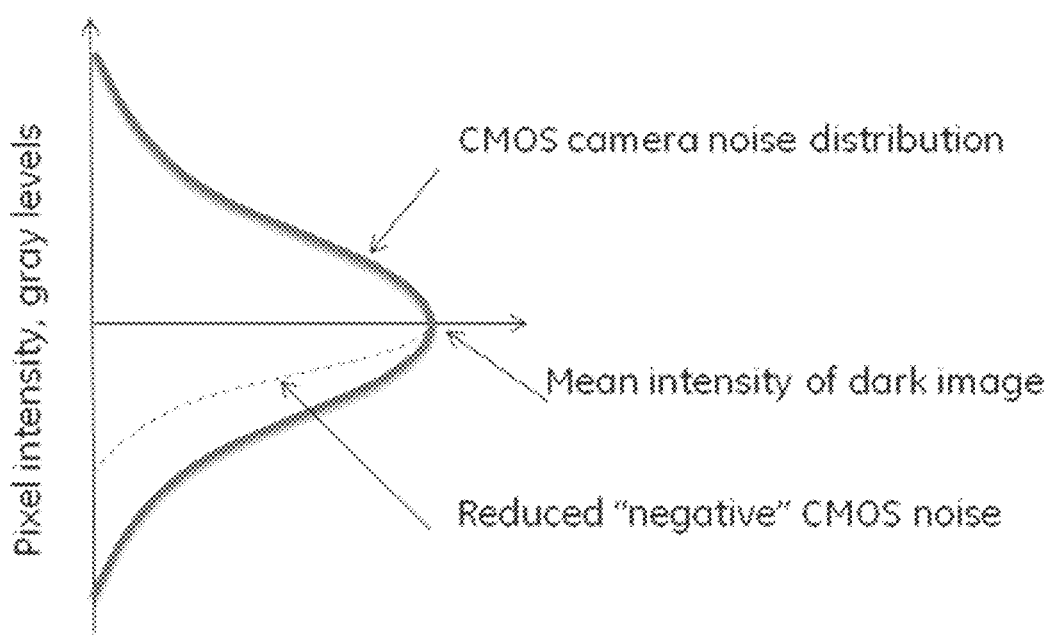
FIG. 1 shows the distribution of CMOS camera noise before and after correction.

A new laser line confocal imager is developed based on a technology of pixel-based confocality implemented using a rolling shutter feature of conventional CMOS cameras. The CMOS camera produces several specific image artifacts that need to be corrected/reduced in raw images to improve visual image quality of obtained images. These include RGB channel offset mismatch and random row offset. Preferably, the random column offset and gain should also be reduced. Moreover, correction of defective pixels should be provided as an option.

The embodiments may be implemented within an image processor associated with a pixel array in an image capture device or may be implemented in a separate image processor which receives captured image data.

The CMOS array detectors are active column detectors. As an example, the principle of operation for the mt9m001 CMOS array imager (½", 1.3 Megapixel, Micron Technologies) is described here:

To read a row, the row is addressed.

For each column, the capacitor in that row is connected to a column amplifier: high gain, low noise, low cutoff frequency. All the other, not enabled, rows are disconnected from the amplifier.

Each column amplifier transfers the signal to an output register. The signal is extracted from each pixel in the output register with a fast amplifier; because of the pre-amplification in the column amplifiers, noise of this amplifier is not important.

The signal is not erased; thus a separate reset signal must be sent to a pixel to zero the charge. In the mt9m001, a row is selected and the whole row is reset.

The amplified signal of the selected row, in the output register, is read. This amplifier is slow, high sensitivity, low noise.

In general, this means that any pixel could be read randomly. The mt9m001 CMOS array imager has the simplest possible implementation of the internal electronics. Basically, the rows are addressed sequentially (rolling shutter) for reset; the rows are addressed sequentially (rolling shutter) for readout and the readout row trails the reset row by a user settable distance (number of rows); this sets the width of the shutter. Finally the pixels in the output register are also addressed sequentially.

The CMOS array detectors are designed for color imaging using a Bayer pattern: in each "base cell" of 2*2 pixels, row pixels in diagonal are green; one of the other two is red; the other is blue.

| R | G | R | G | R | G | R | G |
|---|---|---|---|---|---|---|---|
| G | B | G | B | G | B | G | B |
| R | G | R | G | R | G | R | G |
| G | B | G | B | G | B | G | B |
| R | G | R | G | R | G | R | G |
| G | B | G | B | G | B | G | B |
| R | G | R | G | R | G | R | G |
| G | B | G | B | G | B | G | B |

In order to do color adjustments, the red and blue signals are sent to different amplifiers. Probably for symmetry, the green pixels are subdivided into the same type of sub-arrays: so there are actually 4 post amplifiers.

| R | G1 |
|---|---|
| G2 | B |

Almost all array detectors (and all color array detectors) have additional pixels to do image corrections and adjustments; in the case of the mt9m001 CMOS array detector there are additional top and bottom rows and additional pixels in each row:

16 leading dark columns 2 leading columns, part of a 2 pixel wide frame around the active area.

1 trailing column.

2 trailing columns, part of the 2 pixel wide frame.

9 trailing dark columns

The artifact related to RGB channel offset mismatch is a result of specific CMOS chip design that was originally designed as a color sensor and has four independent imaging channels. In order to obtain a uniform monochromatic image the settings of all four channels shall be identical. However due to unavoidable physical component difference the channels cannot be perfectly matched and the image always has some residual non-random noise (checkers pattern). Certain embodiments of the invention reduce these noises.

The CMOS imager has other problems, some are relevant to general architecture of such optical detectors, which create additional system noise.

Row offset change: An additive, random, high spatial frequency, per row (independent of column) contribution. Range of variation~18 levels=35 e–.

Column gain variations: Multiplicative, fixed, high spatial frequency~1.5%.

The high frequency of all the defects means that they will all degrade analysis quality.

Figure 2:
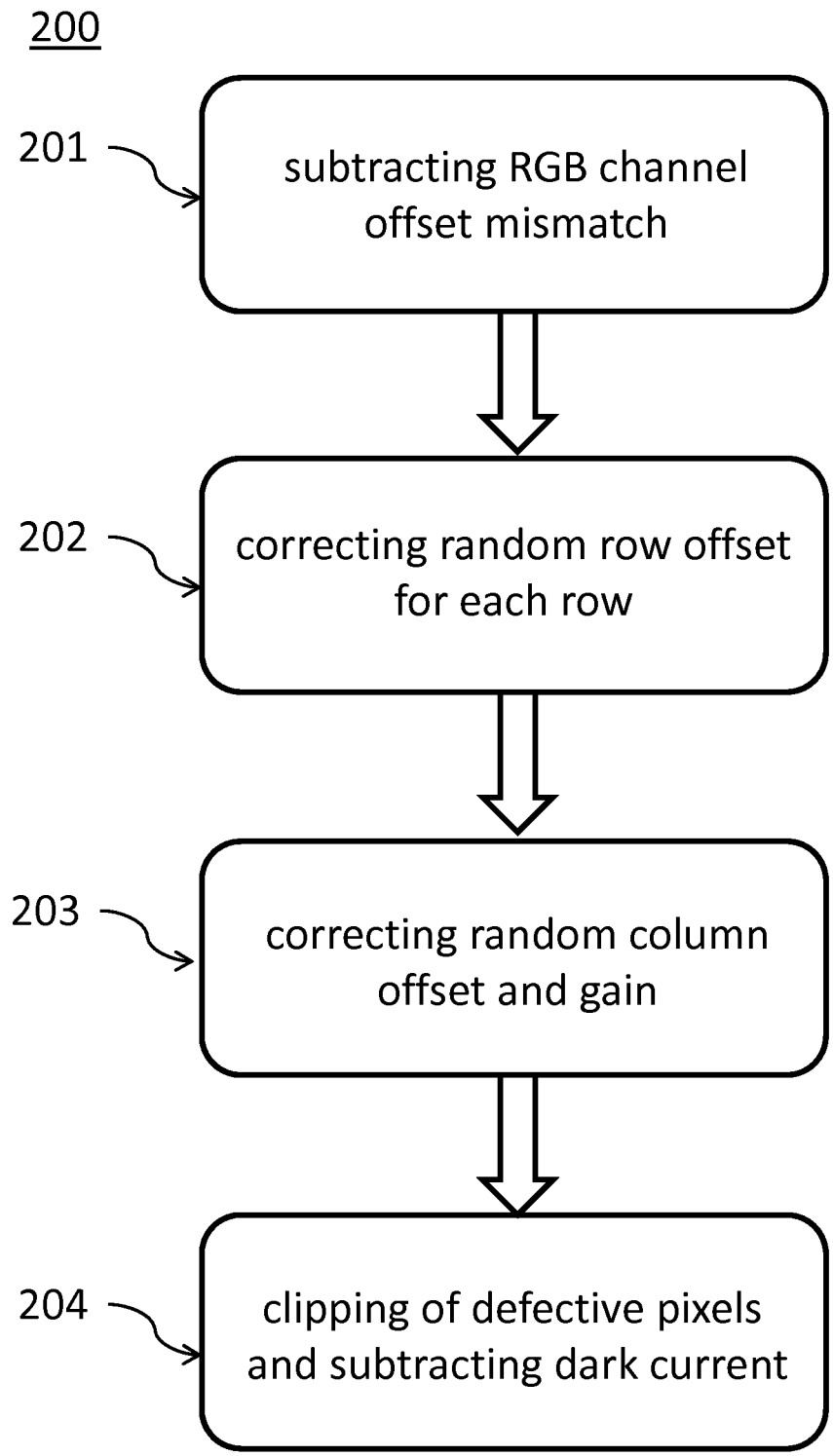
FIG. 2 illustrates example operations involved in a method, according to one or more example embodiments.
Figure 3:
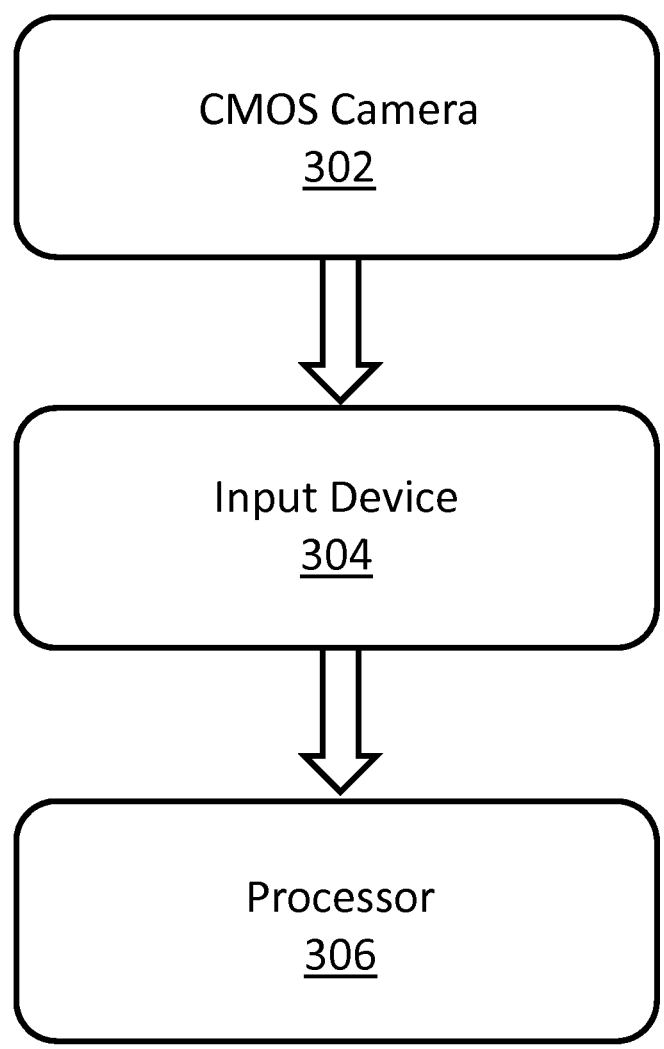
FIG. 3 illustrates example components in a system, according to one or more example embodiments.

Thus, in one aspect of the invention, it is provided a method 200 and system 300 for reducing image artifacts in a monochromatic image from a CMOS array detector. In another aspect of the invention, it is provided a method 200 and system 300 for reducing image artifacts in a monochromatic image for a CMOS camera-based line confocal fluorescent microscope, as illustrated in FIGS. 2 and 3, respectively. These methods include the following sequence of raw image data processing:

1. Grab a frame (raw image data),
2. Shift image and black invalid bit,
3. Subtract RGB offset 201 (required correction):
   a. Red, green and blue pixels,
   b. Calculate pre-black rows average for each group,
4. Subtract row offset (required correction):
   a. Calculate offsets,
   b. Apply weighted offsets 202,
5. Apply column gain variance correction (optional correction) 203:
   a. Establish correction: acquire correction images,
   b. Establish correction: calculate variance,
   c. Establish correction: remove shading,
   d. Correct an image: subtract bias,
   e. Correct an image: apply reference data,
   f. Re-establishing correction images,
6. Clipping 204.
7. Compression of CMOS camera noise.
8. Removing black border.

The following describes an exemplary implementation for CMOS-related image artifact reductions according to an embodiment of the invention.

1. Grab a Frame

Use the LUCAMAPI library function_LucamTakeFastFrame ( ); this function gets a raw data of a single frame in the format of a buffer of size ChipWidth*ChipHeight*16 bits. Each 16-bit element of the buffer represents a single pixel.

2. Shift Image and Black Invalid Bit

The following table explains the process of translating the raw pixel data obtained from the camera to a 12-bit format. The second row enumerates bits in the source pixel and the third row describes them: bits 0 . . . 4 are black; bit 5 is reserved for the driver usage; bits 6 . . . 15 are pixel data. Row 5 of the table enumerates corresponding bits in the target pixel and row 6 explains them: bits 0 and 1 (corresponding to bits 4 and 5 of the source) are black, and bits 2 . . . 11 are a copy of bits 6 . . . 15 of the source pixel.

| Source pixel (16 bit) | | | | | | | | | | | | | | | |
|---|---|---|---|---|---|---|---|---|---|---|---|---|---|---|---|
| 0 | 1 | 2 | 3 | 4 | 5 | 6 | 7 | 8 | 9 | 10 | 11 | 12 | 13 | 14 | 15 |
| Black | | | | | R | Pixel data | | | | | | | | | |
| Target pixel (12 bit) | | | | | | | | | | | | | | | |
| X | X | X | X | 0 | 1 | 2 | 3 | 4 | 5 | 6 | 7 | 8 | 9 | 10 | 11 |
| | | | | Black | | Pixel data | | | | | | | | | |

3. Subtract RGB Offset

Here below the 12-bit pixel buffer obtained as described above is referred as "the raw image". An RGB offset reduction is first applied to it as follows.

3.a. Red, Green and Blue Pixels

The raw pixels are organized in four groups: Red (R), Green 1 (G1), Green 2 (G2) and Blue (B) according to the following pattern:

| | 0 | 1 | 2 | 3 | 4 | 5 | 6 | 7 | 8 | 9 | . . . | . . . | 1310 | 1311 |
|---|---|---|---|---|---|---|---|---|---|---|---|---|---|---|
| 0 | G1 | R | G1 | R | G1 | R | G1 | R | G1 | R | . . . | . . . | G1 | R |
| 1 | B | G2 | B | G2 | B | G2 | B | G2 | B | G2 | . . . | . . . | B | G2 |
| . . . | . . . | . . . | . . . | . . . | . . . | . . . | . . . | . . . | . . . | . . . | | | . . . | . . . |
| 5 | B | G2 | B | G2 | B | G2 | B | G2 | B | G2 | . . . | . . . | B | G2 |
| 6 | G1 | R | G1 | R | G1 | R | G1 | R | G1 | R | . . . | . . . | G1 | R |
| 7 | B | G2 | B | G2 | B | G2 | B | G2 | B | G2 | . . . | . . . | B | G2 |
| . . . | . . . | . . . | . . . | . . . | . . . | . . . | . . . | . . . | . . . | . . . | | | . . . | . . . |
| 1046 | B | G2 | B | G2 | B | G2 | B | G2 | B | G2 | . . . | . . . | B | G2 |
| 1047 | G1 | R | G1 | R | G1 | R | G1 | R | G1 | R | . . . | . . . | G1 | R |

Thus, Red pixels are in even rows - odd columns, Green 1 pixels in even rows - even columns, Green 2 pixels in odd rows - odd columns and Blue pixels in odd rows - even columns, both row and column indices being 0-based. Below the above-defined groups are referred as color groups of pixels.

3.b. Calculate Pre-Black Rows Average for each Group

Rows 0 . . . 5 are black by chip design. Use them in order to establish offset within each color group of pixels.

Calculation of the mean and standard deviation is done in two steps:

1. Within each color group of pixels from the pre-black rows, calculate the mean level and standard deviation over all pixels with non-zero level. Result: avg_r, stdev_r, avg_gl, stdev_gl, etc.
2. Within each color group of pixels from the pre-black rows, calculate the mean and standard deviation again, now over all pixels whose level differs from the mean of step 1 by less than 3*stdev. The result is the mean and standard deviation for each color group.

Then, for each pixel in the given color group, subtract the group mean and add a constant offset of 100. If the result is negative, clip it to 0.

4. Subtract Row Offset

The row-offset reduction is applied next as follows.

4.a. Calculate Offsets

First, in each row calculate mean level for the following groups of pixels:
  Even pre-black columns (on the top of the chip) (0, 2, 4, 6, 8, 10, 12),
  Odd pre-black columns (on the top of the chip) (1, 3, 5, 7, 9, 11, 13),
  Even post-black columns (on the bottom of the chip) (1306, 1308, 1310), and
  Odd post-black columns (on the bottom of the chip) (1305, 1307, 1309, 1311).

Call the results pre_row_offs_even, pre_row_offs_odd, post_row_offs_even, post_row_offs_odd, respectively.

4.b. Apply Weighted Offsets

Since the pre- and post-offsets may be different, they are weighed depending on the distance of the pixel from the left/right end of the row as follows:

$$pre\_weight=(row\_width-column)/row\_width, \text{ and}$$

$$post\_weight=column/row\_width,$$

where column is the column index of the pixel and row_width=ChipWidth=1312

The offset is calculated as follows:

$$offset=pre\_weight*pre\_row\_offs+post\_weight*post\_row\_offs,$$

where pre_row_offs and post_row_offs equal pre_row_offs_even and post_row_offs_even, respectively, for even rows and pre_row_offs_odd and post_row_offs_odd, respectively, for odd rows.

The offset is applied as follows $$new\_pixel\_level=original\_pixel\_level-offset+100$$

5. Apply Column Gain Variance Reduction

Unlike all the previous steps, this optional correction step has to be activated by the user from GUI and, once activated, it requires pre-acquiring correction images, which are then used to correct subsequent images.

5.a. Establish Correction: Acquire Correction Images

First, the usage of the correction must be secured by acquiring correction images within the camera setup dialog (Setup mode, menu: Setting->Select camera . . . , button Define . . . , button Configure . . . ).

The user selects camera modality (High dynamic range or high sensitivity) and presses "Acquire column variance". There are two images, which have to be acquired: a dark noise image (bias image), and a uniform bright image. The dark noise image is obtained by setting illumination level to zero. The uniform image is obtained by imaging a uniform shading specimen. As an option, multiple frames may be taken at different locations and averaged.

A correction image is calculated by subtracting the dark noise image from the bright image. The correction image will be used as basis for correcting all subsequent images acquired with this camera definition.

5.b. Establish Correction: Calculate Variance

For each column of the correction image, calculate average and standard deviation within each color group, which is represented in this column, that is, blue and green 1 for even columns and red and green 2 for the odd columns Skip the leading and the trailing black columns, and, within each column, skip the leading and trailing black rows.

Once the average and standard deviation is calculated, calculate it again, now for those pixels only, which are within 3-sigma distance from the average. The result of this step is four vectors containing column variance for each of the four colors.

5.c. Establish Correction: Remove Shading

Now, remove shading from each of the four column-variance vectors. This involves two steps. In the first step, for each color, create a reference vector from the original one applying a box filter with kernel size being $\frac{1}{32}$ of the vector size+3. The box filter replaces each entry with the average of the entries lying within $\frac{1}{2}$ kernel size from the entry.

In the second step, apply flat field correction operation to each of the four column-variance vectors using the averaged data obtained in the first step as reference. More specifically, if orig is the entry in the original column-variance vector, ref is a corresponding entry in the reference vector and avg is the average value of the reference vector, the corrected value new is calculated as follows:

$$new=avg*orig/ref$$

5.d. Correct an Image: Subtract Bias

If a bias image has been established, its pixels are subtracted from the image under correction now (new_pixel_level=original_pixel_level−bias_pixel_level+offset).

5.e. Correct an Image: Apply Reference Data

Using the four variance-vectors that were pre-established for each color, correct the image as follows:

$$corrected\_pixel=(original\_pixel-offset)*average/variance\_vector\_value+offset,$$

where average is the average value of the variance vector for the given color and offset=100.

5.f. Re-Establishing Correction Images

The correction images must be re-established if (1) the Camera modality is changed; or (2) the slit width (rolling shutter width) is changed.

6. Clipping

As a result of the above modifications, some pixel values may become larger than the maximum value of 4095. Such pixels are now clipped to 4095.

Note that clipping of negative values to 0 must be done at the end of each step because of the type casting issue: a negative value cast to unsigned would become large, so a black pixel would become saturated as a result. However, clipping of the large values may be done just once: indeed, a temporary value larger than 4095 would become negative after casting to an unsigned integer only if a value of 65535 were surpassed. The nature of the above calculations rules out such possibility.

Clipping of the out of range values could be applied only once, namely, while processing the last applicable correction.

7. Compression of CMOS Camera Noise

When the fluorescent microscope is used to image dim samples, especially if fluorescent background is low, the visible noise on the image is primarily coming from CMOS camera as random horizontal and vertical lines with uneven intensity. The following image processing procedure is applied to reduce visual appearance of the CMOS camera noise without affecting fluorescent data, i.e. without using any low pass, Gaussian smooth filters and other corrections that will affect whole image. In other words, this procedure selectively processes the pixels that likely have only CMOS noise and will not apply any correction to other pixels on the image.

As an example, such compression can be realized as a following procedure:

1. Typical dark images that are obtained from CMOS camera may have following Mean, StDev and Range values:

Low CMOS Gain:
at 64 ms exposure: Mean=100+/−1, StDev=3, Image range 88-112
at 1.0 s exposure: Mean=100+/−1, StDev=3, Image range 87-113

High CMOS Gain:
at 64 ms exposure: Mean=100+/−1, StDev=7, Image range 64-136
at 1.0 s exposure: Mean=110+/−1, StDev=9, Image range 66-162

Note: these experimental data describe images obtained with software offset=100 gray levels. It means that the value of each pixel was increased by 100.

From these data it can be seen that CMOS noise for a dark image is centered around mean intensity of dark image and has equal amplitude below and above this mean level. Therefore we can think about "positive noise" (>mean intensity of dark image) and "negative noise" (<mean intensity of dark image).

2. Assuming pixels that are part of positive noise may potentially have some useable signal; therefore they shall not be adjusted in any way in order to preserve quality of original data.

3. However all pixels with values less than mean intensity of the dark image are dominated by the camera noise, and even if they have some amount of "useful" signal, it is totally masked with CMOS noise. Their impact on visual appearance on the image can be reduced by a linear processing. For example, the "negative" amplitude of noise with respect to mean level dark image can be reduced using the following algorithm:

For all pixels with intensity I<Mean Intensity of Dark Image $$I_{new}=K_{reduction}*(Mean\_Intensity\_of\_Dark\_Image-I)+Mean\_Intensity\_of\_Dark\_Image,$$

where Kreduction is a constant set within 0.0-1.0 range to, for example, 0.5. In this case the amplitude of "negative" noise will be reduced twice (FIG. 1).

Since this equation uses mean intensity of dark image as a reference, this correction will be self-adjusted for small variations of dark background as a function of exposure time.

4. The same procedure can be applied to "positive" noise as well. For "positive" noise reduction the equation becomes:

For all pixels with intensity I>Mean Intensity of Dark Image+X*StDev, where StDev is a standard deviation of dark pixels of CMOS camera and X is used selected value in a range of 0-10, the resulting intensity will become:

$$I_{new}=K_{reduction}*(I-Mean\_Intensity\_of\_Dark\_Image I)+Mean\_Intensity\_of\_Dark\_Image,$$

where Kreduction is set within 0.0-1.0 range to, for example, 0.5. In this case the amplitude of "positive" noise will be reduced twice.

The procedure above describes a linear noise compression (Kreduction is constant) when noise intensity is reduced proportionally to the noise amplitude. It shall be noted that any non-linear function for Kreduction such as exponential can be used as well to vary strength of compression.

The described procedure has been implemented in image acquisition software for a prototype fluorescence image and demonstrated very effective visual improvement of image quality for dim samples.

8. Removing Black Border

Before sending to the user's interface, the image is cropped to the standard size of 1280 by 1024. The cropping starts at row 12 and column 20 so that all pixels in the cropped image will lie within the range of valid pixels.

All patents, patent publications, and other published references mentioned herein are hereby incorporated by reference in their entireties as if each had been individually and specifically incorporated by reference herein. While preferred illustrative embodiments of the present invention are described, one skilled in the art will appreciate that the present invention can be practiced by other than the described embodiments, which are presented for purposes of illustration only and not by way of limitation. The present invention is limited only by the claims that follow.

What is claimed is:

1. A processor implemented method for reducing image artifacts in a monochromatic image from a CMOS camera in a line confocal fluorescent imager comprising:
   subtracting, by at least one image processor, RGB channel offset mismatch;
   correcting random row offset for each row;
   correcting random column offset and gain; and
   clipping of defective pixels.

2. The method of claim 1, further comprising subtracting dark current.

3. The method of claim 1, wherein the subtracting operation includes:
   (a) calculating the mean level and standard deviation over all pixels with non-zero level, within each color group of pixels from pre-black rows;
   (b) calculating the mean and standard deviation again, over all pixels whose level differs from the mean of operation (a) by less than 3 times the standard deviation, to obtain the group mean and standard deviation for each color group;
   (c) subtracting the group mean obtained from operation (b) from a constant offset of 100 to obtain a difference;
   (d) clipping the difference obtained in (c) clip it to 0 when said difference is less than zero; and
   (e) repeating operations (a) through (c) for each of the other color group of pixels until measurement is completed for all color groups.

4. The method of claim 1, wherein the correcting operation includes:
   (a) calculating mean level for groups of pixels including pre-black even columns, pre-black odd columns, post-black even columns and post-black odd columns; and
   (b) applying a weighed offset for each of the mean levels.

5. The method of claim 1, wherein the correcting random column offset and gain operation includes:
   (a) generating correction images including acquiring a dark noise image and a uniform bright image, then subtracting the dark noise image from the bright image;

(b) calculating, for each column of the correction image, average and standard deviation within each color group; and calculating an average and standard deviation again, for those pixels which are within 3 sigma distance from the average to acquire four vectors containing column variance for each of the four colors;

(c) removing shading from each of the four column variance vectors;

(d) optionally subtracting bias image pixels from the image under correction;

(e) correcting the image using the four vectors containing column variance for each of the four colors; and (f) re-establishing the correction image if necessary.

6. The method of claim 1, wherein the monochromatic image is a fluorescence image and the method further comprises an operation of compressing CMOS camera noise.

7. The method of claim 6, wherein the operation of compressing CMOS camera noise is implemented by altering original pixel intensity value by an amount that depends from a difference between actual pixel intensity and dark image mean intensity.

8. A processor implemented method for reducing image artifacts in a monochromatic image from a CMOS camera in a line confocal fluorescent imager, the method comprises:

(a) calculating, by at least one image processor, the mean level and standard deviation over all pixels with non-zero level, within each color group of pixels from pre-black rows;

(b) calculating the mean and standard deviation again, over all pixels whose level differs from the mean of operation (a) by less than 3 times the standard deviation, to obtain the group mean and standard deviation for each color group;

(c) subtracting the group mean obtained from operation (b) from a constant offset of 100 to obtain a difference;

(d) clipping the difference obtained in (c) clip it to 0 when said difference is less than zero; and (e) repeating operations (a) through (c) for each of the other color group of pixels until measurement is completed for all color groups.

9. A system for reducing image artifacts in a monochromatic image from a CMOS camera in a line confocal fluorescent imager, said system comprising:

(a) an input device configured to provide image data from the CMOS camera; and (b) a processor coupled to the input device and configured to:
subtract RGB channel offset mismatch;
correct random row offset for each row
correct random column offset and gain; and
clip defective pixels.

10. The system of claim 9, wherein the processor is also configured to subtract dark current.

11. The method of claim 9, wherein the monochromatic image is a fluorescence image and the processor is also configured to compress CMOS camera noise.

12. An image artifact reduction system for reducing image artifacts in a monochromatic image from a CMOS camera-based line confocal fluorescent microscope, the system comprising:

(a) one or more CMOS cameras capable of generating monochromatic images; and (b) a system for reducing image artifacts for the monochromatic image, the system including:
at least one input device configured to provide image data from the CMOS camera; and
at least one image processor coupled to the at least one input device and configured to: subtract RGB channel offset mismatch; correct random row offset for each row, correct random column offset and gain; and clip defective pixels.

13. The system of claim 12, wherein the at least one image processor is also configured to subtract dark current.

14. The method of claim 12, wherein the monochromatic image is a fluorescence image and the at least one image processor is also configured to compress CMOS camera noise.

* * * * *